Dec. 26, 1944. C. U. GRAMELSPACHER 2,365,754
PLYWOOD BARREL
Filed Feb. 12, 1942 2 Sheets-Sheet 1

Inventor
CLARENCE U. GRAMELSPACHER
by Toulmin & Toulmin
Attorneys

Dec. 26, 1944.   C. U. GRAMELSPACHER   2,365,754
PLYWOOD BARREL
Filed Feb. 12, 1942   2 Sheets-Sheet 2

INVENTOR
CLARENCE U. GRAMELSPACHER
BY Toulmin & Toulmin
ATTORNEYS

Patented Dec. 26, 1944

2,365,754

UNITED STATES PATENT OFFICE 2,365,754

PLYWOOD BARREL

Clarence U. Gramelspacher, Jasper, Ind.

Application February 12, 1942, Serial No. 430,665

10 Claims. (Cl. 144—309)

This invention relates to a method and apparatus for manufacturing wood barrels from thin wood plies.

An object of the invention is to provide a method for manufacturing plywood barrels.

Another object of the invention is to provide an apparatus for manufacturing plywood barrels.

Another object of the invention is to provide a method of manufacturing plywood barrels wherein the plies are so arranged with respect to one another that there is no definite seam through the barrel.

It is another object of the invention to provide a method for manufacturing plywood barrels of conventional shape wherein the plies, forming the wall of the barrel, are disposed in approximate position with respect to one another within a suitable form, and the plies are expanded outwardly against the form to cause adherence between the adjacent plies.

Another object of the invention is to provide a method for manufacturing plywood barrels in accordance with the foregoing object wherein the plies are cut to a predetermined configuration and assembled within a suitable form.

Another object of the invention is to provide a method for manufacturing plywood barrels wherein the plies from which the barrel is to be produced have the grain thereof running 90° with respect to one another.

Another object of the invention is to provide a method for manufacturing plywood barrels wherein pre-cut plies are assembled within a suitable form and an expansible bag is disposed within the barrel form to expand the plies against the barrel form to cause adhesion between the plies.

It is another object of the invention to provide an apparatus for manufacturing plywood barrels which causes the plies to be moved with respect to one another to conform roughly to the shape of a barrel, and an expansible bag finishes the forming of the barrel.

Further objects and advantages will become apparent from the drawings and the following description.

In the drawings:

Figure 5 is a horizontal cross-sectional view of the apparatus for forming the barrel, taken along line 5—5 of Figure 6, showing the form in open position and the cylindrical barrel disposed therein.

Figure 6 is a transverse cross-sectional view taken along line 6—6 of Figure 5, showing the form being closed upon the cylindrical barrel form.

Figure 7 is a horizontal cross-sectional view taken along the same line as Figure 5, showing the expansible bag expanded to cause the wood plies to conform to the mold of Figure 6.

In this invention the applicant produces a barrel of conventional shape from a plurality of wood plies which is disposed in adjacent relationship and secured to one another by suitable means. Sheets of plywood are cut to a predetermined configuration and are then rolled into the form of a cylinder. The cylinder is then placed within a suitable form which is closed upon the cylinder to cause the precut sheets of plywood to form to the configuration of the form. Before the sheets are rolled into the cylinder a suitable adhesive is placed upon one or both of the faces of adjacent plies so that when placed in the form and expanded against the wall of the form the sheets of plywood will adhere to one another. The formed barrel is removed from the form and suitable end walls are then secured within the ends of the barrel.

The process of manufacture is started by first securing two sheets of plywood 10 and 11 together having the grain of the sheets arranged 90° with respect to one another. The sheets 10 and 11 have suitable adhesive applied thereon to secure the same in adjacent relationship, thus forming a two-ply board. While the invention will be described with regard to the use of two-ply board, yet it is to be understood that individual plies can be handled in the same manner as the two-ply board, or the board can be composed of more than two plies. The purpose of using boards composed of two or more plies is to reduce the danger of splitting of the ply sheets when bent or formed during certain operations of the process.

The conventional barrel has a shape wherein the ends of the barrel are smaller in diameter than the center of the barrel. Thus, to form a barrel of conventional shape from a sheet of plywood the sheet must be precut in a manner to permit the edges of the sheet to be drawn closer together than the mid portion thereof.

Figure 3:
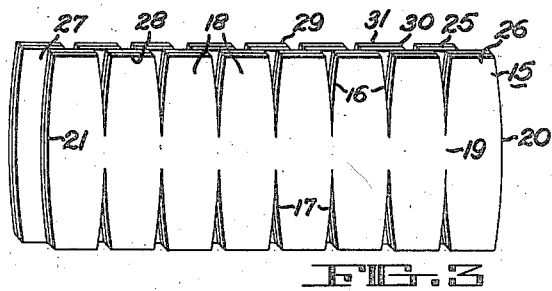
Figure 3 is a perspective elevational view of the preassembled plywood sheets precut and shown in their assembled relationship.

In Figure 3 the two-ply board 15 is provided with a series of arcuately shaped cuts 16 extending transversely of the sheet from the edge toward the center thereof. A similar series of cuts 17 is provided in the opposite edge of the sheet. These cutaway portions 16 and 17 are substantially V-shaped with the base of the V toward the center of the ply board 15. The bases of the V-cuts 16 and 17 do not join one another and therefore the ply board 15 is not severed into individual pieces but rather retains its original condition as a sheet. The V-cuts 16 and 17 have arcuate shaped sides so that the portions between the adjacent cuts 16 form a stave 18. The staves 18 are joined to one another by means of the solid portion 19 between the bases of the V-cuts 16 and 17.

The length of the ply board 15 is such that when rolled into the form of a cylinder the opposite edges 20 and 21 thereof will abut one another, thus forming a cylinder of proper diameter which will be the diameter of the completed barrel.

A second ply board sheet 25 is prepared in the same manner as the ply board sheet 15 except that the ply board sheet 25 will be slightly longer than the ply board sheet 15. The ply board sheet 25 is adapted to encircle the ply board sheet 15 and hence the need for a sheet which is slightly longer than the sheet 15.

The ply board sheets 15 and 25 have adhesive applied on either or both of their faces 26 and 27 respectively to cause adherence between the sheets during a subsequent operation of the process. The adhesive may be of liquid type or of a sheet type and is preferably a resinous material to produce a waterproof joint between ply board sheets.

The ply board sheet 15 is disposed upon the ply board sheet 25 in a manner that the longitudinal edges 28 and 29 are in substantial alignment and the V-cuts 16 and 17 are positioned substantially midway between the V-cuts 30 provided in the ply board sheet 25, thereby placing the V-cuts 16 and 17 upon the staves 31 of the ply board sheet 25.

Figure 4:
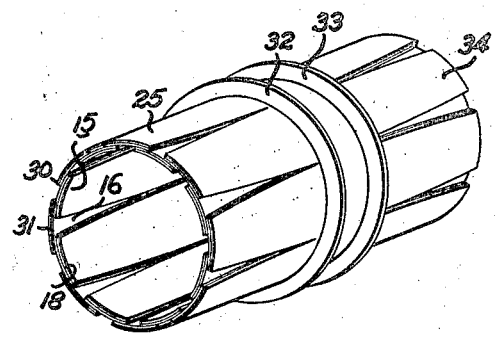
Figure 4 is a perspective elevational view of the sheet of plywood rolled into a cylinder and having retaining rings thereon to hold the same in cylindrical form.

The ply board sheets 15 and 25 are then rolled into the form of a cylinder (as shown in Figure 4) the V-cuts 16 and 17 remaining adjacent the staves 31 and the V-cuts 30 being adjacent the staves 18, whereby an overlapping joint structure is provided. Rings 32 and 33 are placed upon the cylinder 34 produced by the rolled form of the ply board sheets 15 and 25 to retain the sheets in cylindrical form. At this time the edges 20 and 21 of the ply board sheet 15 are in abutting relationship and the corresponding edges of the ply board sheet 25 are in abutting relationship thereby producing a cylinder of proper diameter from which the barrel can be formed.

The assembled cylinder 34 is then provided with a pair of straps 35 and 36 around opposite ends thereof to draw the ends into a slightly smaller diameter than the mid portion of the cylinder 34. The cylinder 34, with the straps 35 and 36 thereon, is then placed within a form 40 which consists of two halves 37 and 38 hinged together by means of a hinge 39.

The two halves 37 and 38 forming the form 40 are semi-circular in shape so that when the member 38 is closed upon the member 37 a cylinder will be formed. A suitable latch 41 is adapted to engage a catch 42 for securing the halves 37 and 38 in closed position. The halves 37 and 38 are each provided with a half ring 43 and 44 respectively which are raised from the interior surfaces 45 and 46 of the respective halves 38 and 37. The half rings 43 and 44 thereby form a complete ring when the members 37 and 38 are closed. Suitable heating passages 47 and 48 are provided in the rings 43 and 44.

A pair of cylindrical heads 49 and 50 is adapted to slide within the cylindrical form 40. These heads 49 and 50 have internal walls 51 and 52 which have the desired configuration for the end of a conventional barrel. Closure plates 53 and 54 are provided for the heads 49 and 50 and are connected to suitable rams 55 and 56 respectively.

The walls 51 and 52 in their respective heads 49 and 50 are spaced from the outer walls 57 and 58 to form fluid chambers 59 and 60 respectively in the heads 49 and 50. Suitable fluid inlets 61 and 62 are provided for the chambers 59 and 60 as well as suitable outlets 63 and 64. The chambers 59 and 60 are adapted to receive fluid in any form, such as liquid or steam, for heating the ply board sheets when the heads 49 and 50 are closed upon the same. The rams 55 and 56 may be connected to any suitable source of power for reciprocating the heads 49 and 50 within the cylindrical form 40.

An expansible bag 65 is positioned within one of the heads 49 or 50 and may be secured to the head. A suitable fluid inlet 66 is provided for the expansible bag 65 and may extend through the end wall 53 of the head 49 for connection to a suitable source of fluid pressure, such as liquid or air. The expansible bag can be made of rubber or any other resilient material which is capable of stretching to conform to the interior configuration of the barrel to be formed within the apparatus.

As previously mentioned the cylindrical barrel form 34 has just been positioned within the open cylindrical form 40 (as shown in Figure 5). The apparatus for reciprocating the rams 55 and 56 will then be operated to advance the heads 49 and 50 until they enter the member 37 a slight distance (as shown in Figure 5).

At this time the straps 35 and 36 are removed from the ends of the cylindrical form 34 of the barrel, whereby the ends of the barrel will engage the inner walls 51 and 52 of the heads 49 and 50.

The member 38 is then closed upon the member 37 and locked thereto by means of the latch 41. The heads 49 and 50 are then advanced toward the center of the cylindrical form 40 until the ends thereof engage the rings 32 and 33. The staves 18 and 31 will be moved inwardly toward the axis of the barrel to conform to the contour of the walls 51 and 52 in the heads 49 and 50 respectively. When the heads 49 and 50 have completed their travel into the cylindrical form 40 the edges of adjacent staves will be in abutting relationship with respect to one another. As heretofore disclosed, the V-cuts in the sheets forming the staves have been disposed upon the stave adjacent the cut whereby the butt joint between adjacent staves will be positioned upon the face of the stave adjacent thereto above or below the same.

The expansible bag 65 carried by the head 49 is moved within the body of the cylindrical barrel form 34 when the head 49 contacts the end of the cylinder 34 and bends the end of the cylinder into conformity with the inner wall surface 51 of the head 49. A suitable fluid is then admitted into the interior of the expansible bag through the inlet opening 66 to expand the bag 65 into engagement with the inner wall surface of the cylindrical barrel form 34. The bag 65 expands the sheets of plywood in the barrel form 34 outwardly against the inner surfaces 51 and 52 of the heads 49 and 50 with one sheet in engagement with the other. This expansive movement of the plywood sheets causes them to first slide with respect to one another so that the adjacent stave portions of the various sheets will have the adjacent joints thereof brought into proper abutting relationship.

The fluid admitted into the expansible bag 65 may be either a liquid or a gas and is preferably heated so that the internal wall of the cylindrical barrel form 34 will be heated.

Heating fluid is circulated through the chambers 59, 60 and 48 to heat the barrel form 34 from the exterior thereof whereby the bonding material disposed between the ply board sheets will be set and cause adherence between adjacent ply board sheets.

After a suitable period of time the expansible bag 65 is deflated and the heads 49 and 50 will be retracted from within the cylindrical form 40, the member 38 will be lifted from the member 37 to open the form 40 and the barrel will then be removed. The rings 32 and 33 can then be removed from the barrel 70.

Figure 10:
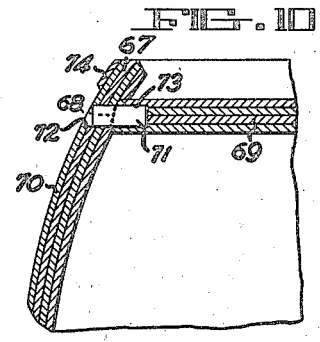
Figure 10 is a cross-sectional view of a portion of a completed barrel showing the head fastened in place therein.

The ends 67 of the barrel 70 are then trimmed to the desired shape (as shown in Figure 10). A recess 68 is cut in the inner face of the barrel 70 near the edge 67 to receive a ply board end closure wall 69.

The ply board closure wall 69 is inserted endwise into the interior of the barrel 70 and is then turned horizontally and forced into the recess 68. Suitable dowel pins 71 are driven through holes 72 provided in the side of the barrel 70 and into holes 73 provided in the head 69.

A metal reenforcing ring 74 may be placed around opposite ends of the barrel 70 to reenforce the edges thereof to prevent damage during handling of the barrel.

This invention thereby provides a process wherein plies of wood can be superimposed upon one another within a suitable form and be expanded outwardly against the walls of the form to cause the plies to conform to the shape of the form. The plies of wood may shift slightly with respect to one another to arrange themselves in proper order, as determined by the precut arrangement of the plies. If the plies are cut accurately the joint between adjacent staves formed in the plies will be almost imperceptible. However, if the cuts in the ply board forming the staves should be somewhat inaccurate the location of the cuts upon an adjacent stave provides a barrel which is leak proof because there is no seam which extends completely through the wall of the barrel. Even though one of the seams should stand open slightly there can be no leakage since the ply board adjacent the seam will prevent the same.

Figure 1:
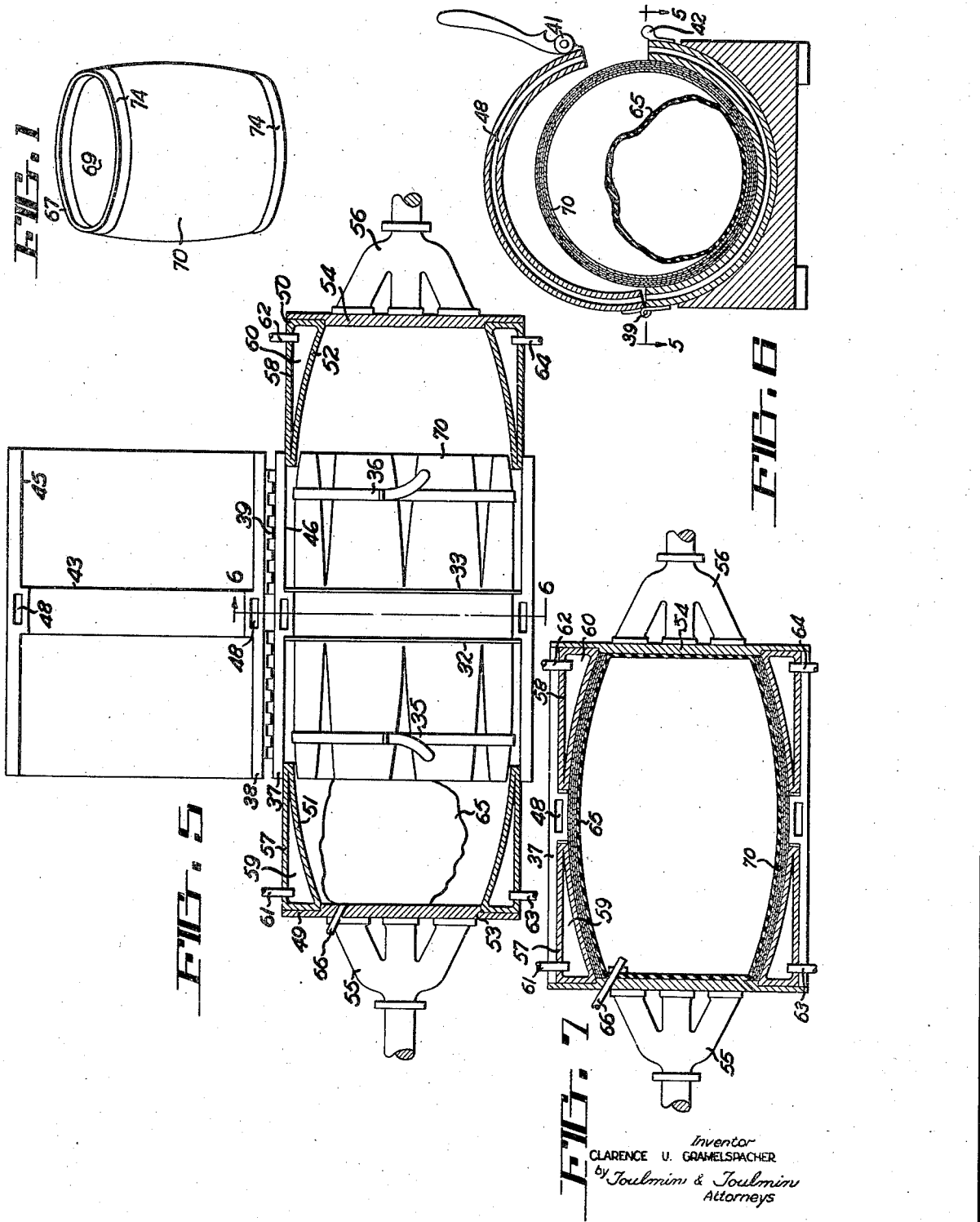
Figure 1 is a perspective elevational view of a plywood barrel constructed in accordance with the teachings of this invention.
Figure 2:
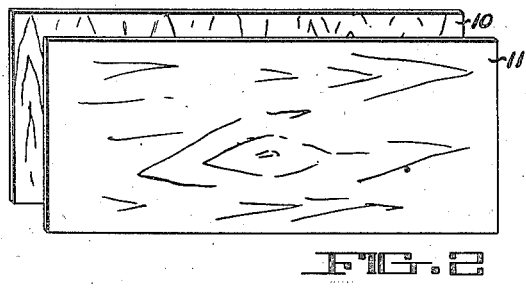
Figure 2 is a perspective elevational view of the plies for forming a sheet of plywood having the grain positioned 90° with respect to one another.

The completed product is shown in Figure 1 wherein the barrel 70 has the head 69 in position thereon and the metal reenforcing ring 74 suitably secured to opposite ends of the barrel.

It is to be understood that while the process and apparatus herein described has been made with particular reference to a barrel of conventional shape, yet the process and apparatus is applicable to the manufacture of cylindrical drums or barrels as well as one of conventional shape. If the drum or barrel is to be a true cylinder then it would not be necessary to make the V-cuts in the sheets of plywood. The process would therefore be considerably simplified when a cylindrical article was produced. However, the other steps of the process would remain the same.

Figure 8:
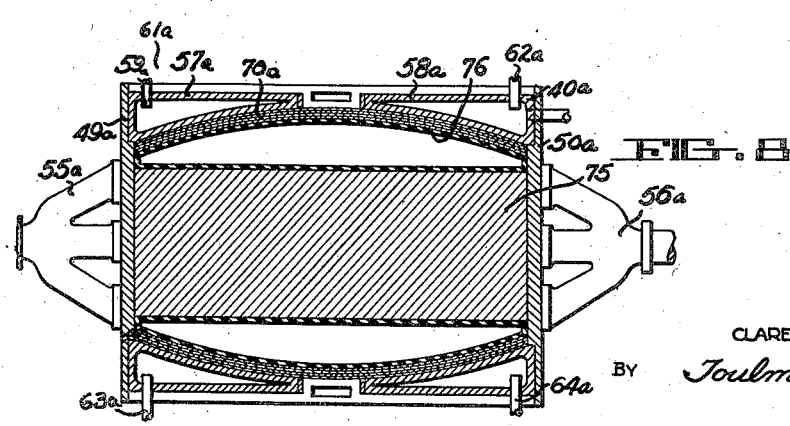
Figure 8 is a horizontal cross-sectional view of the apparatus for forming the barrel, showing a filler plug within the form to fill some of the internal volume of the form.

In Figure 8 there is shown a slightly modified form of apparatus for manufacturing the barrels of this invention. In the apparatus disclosed herein the form 40a is identical with the form 40 disclosed with regard to Figure 5 and the heads 49a and 50a perform the same function as disclosed with regard to the apparatus of Figure 5 and are identical in construction thereto. Therefore, the elements of Figure 8, which are identical with the elements of Figure 5, bear the same reference numerals but with the suffix "a."

The expansible bag disclosed in Figure 8 is modified from that disclosed in Figure 5 in the manner that a central core 75 is provided. The expansible bag 76 is disposed around the core 75 somewhat in the manner of an inner tube. The central core 75 fills a portion of the volume of the interior of the barrel form 40a so that it will not be necessary to introduce as much fluid into the expansible bag 76 before sufficient pressure is developed therein to expand the ply boards into engagement with the barrel form 40a and into engagement with one another. The apparatus disclosed in Figure 8 therefore shortens the period required to expand the bag 76 and therefore shortens the period of the entire process.

Figure 9:
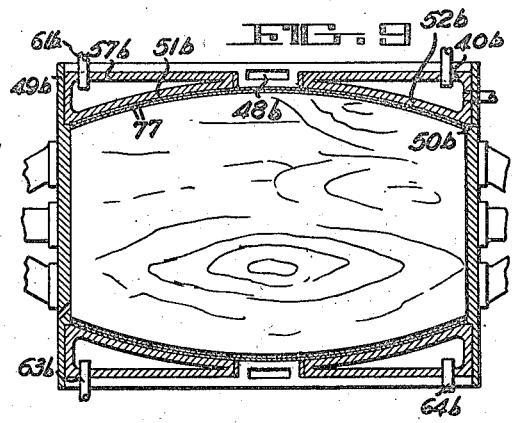
Figure 9 is a horizontal cross-sectional view of the mold shown in Figures 5, 6 and 7, but having a filler member positioned therein for producing a barrel of slightly smaller diameter.

In Figure 9 there is disclosed a modification wherein a barrel of slightly smaller dimension can be made. In the apparatus of Figure 9 the barrel form 40b is identical with the construction of the barrel form disclosed in Figure 5. However, in Figure 9 there is shown a series of rings 77 which are disposed adjacent the walls 51b and 52b, in the heads 49b and 50b respectively. These rings have the same contour as the walls 51b and 52b but provide a mold wall which is slightly smaller in diameter than the mold wall formed by the walls 51b and 52b.

The arrangement of Figure 9 thus provides an apparatus whereby a barrel of somewhat smaller dimension can be manufactured than the dimension of the barrel disclosed in Figure 5.

It is to be understood that the apparatus and the method for forming a barrel as disclosed herein is a preferred method and apparatus. However, there are numerous mechanical modifications which can be applied to the apparatus, and the steps of the process can be varied slightly without departing from the spirit of the invention, and such modifications are included herein as fall within the scope of the appended claims.

Having thus fully described my invention what I claim as new and desire to secure by Letters Patent is:

1. A method of manufacturing a barrel which

1. A method of manufacturing a barrel which consists of precutting sheets of wood to form a plurality of joined staves, of disposing adhesive material between adjacent sheets, of arranging a plurality of sheets within a form having the interior surface in the configuration of a barrel, and of expanding the sheets outwardly against the interior surface of the form until the adhesive has set.

2. A method of manufacturing a barrel which consists of precutting sheets of wood to form a plurality of joined staves, of disposing adhesive material between adjacent sheets, of arranging a plurality of sheets within a form having the interior surface in the configuration of a barrel in a manner that the joints between adjacent staves in one of the sheets are disposed upon the staves of an adjacent sheet, and of expanding the sheets outwardly against the interior surface of the form until the adhesive has set.

3. A method of manufacturing a barrel which consists of precutting sheets of wood to provide a plurality of staves joined substantially at their mid-sections, of positioning a plurality of precut sheets in adjacent relationship with the joints between adjacent staves of one of the sheets positioned upon the staves of an adjacent sheet, of disposing adhesive between adjacent sheets, of bending the sheets longitudinally into the form of a cylinder with the joints of the sheets retained in the prearranged positions, of enclosing the cylinder within a form having the interior surface in the configuration of a barrel, and of expanding the sheets outwardly into engagement with one another and into engagement with the interior surface of the form.

4. A method of manufacturing a barrel which consists of precutting sheets of wood to provide a plurality of staves joined substantially at their mid-sections, of positioning a plurality of precut sheets in adjacent relationship with the joints between adjacent staves of one of the sheets positioned upon the staves of an adjacent sheet, of disposing adhesive between adjacent sheets, of bending the sheets longitudinally into the form of a cylinder with the joints of the sheets retained in the prearranged positions, of enclosing the cylinder within a form having the interior surface in the configuration of a barrel, of contracting the ends of the cylinder to bring the edges of adjacent staves into abutting relationship, and of expanding the sheets outwardly into engagement with one another and into engagement with the interior surface of the form.

5. A method of manufacturing a barrel which consists of joining two faces of plywood sheets with the grain thereof running angularly with respect to one another in adjacent sheets, of cutting the plywood sheets in a manner to form a plurality of staves joined together at their mid-sections, of disposing adhesive material adjacent one of the faces of the sheets, of positioning a plurality of precut plywood sheets within a form having the interior surface in the configuration of a barrel and with the joints between adjacent staves of one sheet being positioned upon the stave of an adjacent sheet, of moving the ends of the staves with respect to one another toward the axis of the barrel upon axial movement of the form relative to the barrel to be formed thereby until the edges thereof abut one another, and of applying pressure to the internal surface of the barrel until the adhesive sets.

6. A method of manufacturing a barrel which consists of joining two faces of plywood sheets with the grain thereof running angularly with respect to one another in adjacent sheets, of cutting the plywood sheets in a manner to form a plurality of staves joined together at their mid-sections, of disposing adhesive material adjacent one of the faces of the sheets, of positioning a plurality of sheets in adjacent relationship with the joints between adjacent staves in one sheet being positioned upon the staves of an adjacent sheet, of forming the sheets into a cylinder in their prearranged relationship, of contracting the ends of the cylinder until the edges of adjacent staves abut each other, of applying internal pressure to the interior surface of the barrel, and of applying heat to the barrel to cause the adhesive to set.

7. A method of manufacturing a barrel comprising cutting sheets of plywood to form a plurality of staves arranged in adjacent relationship and joined at their mid sections, of positioning a plurality of sheets in adjacent relationship so that the joints between adjacent staves of one sheet are disposed upon the staves of an adjacent sheet, of disposing adhesive between adjacent sheets, of transversely bending the sheets to form a cylinder, of slightly contracting the ends of the cylinder, of placing the cylinder within a form having the interior surface in the configuration of a barrel, of releasing the ends of the cylinder to permit engagement with the interior surface of the form, of completely contracting the ends of the cylinder until the edges of adjacent staves are in abutting relationship, and of applying pressure upon the internal surface of the barrel to expand the outer surface into engagement with the inner surface of the form until the adhesive is set.

8. A method of manufacturing a barrel comprising cutting sheets of plywood to form a plurality of staves arranged in adjacent relationship and joined at their mid-sections, of positioning a plurality of sheets in adjacent relationship so that the joints between the staves of one sheet are disposed upon the staves of an adjacent sheet, of disposing adhesive between adjacent sheets, of transversely bending the sheets to form a cylinder, of slightly contracting the ends of the cylinder, of placing the cylinder within a form having the interior surface in the configuration of a barrel, of releasing the ends of the cylinder to permit engagement with the interior surface of the form, of completely contracting the ends of the cylinder until the edges of adjacent staves are in abutting relationship, and of applying pressure upon the internal surface of the barrel to cause the sheets of plywood to move outwardly toward the inner surface of the form until the outer surface of the outermost sheet in the form engages the inner surface of the form and each subsequent inner sheet engages the outer sheet adjacent thereto, the various sheets shifting with respect to one another until they are in engagement throughout their entire surface until the adhesive is set.

9. A method of manufacturing a barrel comprising face joining sheets of wood having the grain thereof disposed angularly in the adjacent sheets, of placing substantially V-shaped cuts in opposite edges of the sheets to form a plurality of joined staves positioned in adjacent relationship, of disposing a plurality of precut sheets in adjacent relationship having the V-shaped cuts in one sheet disposed upon the staves of the adjacent sheet, of placing adhesive between adjacent sheets, of rolling the sheets into the form of a cylinder while retaining their prearranged relationship, of placing retaining rings upon said cylinder, of contracting the ends of said cylinder, of placing said cylinder within a form having movable ends having the interior surface in the configuration of a barrel, of releasing the ends of the cylinder into engagement with the interior surface of the ends of the form, of contracting the ends of the cylinder by movement of the ends of the form toward one another until the edges of adjacent staves are in abutting relationship, and of applying pressure internally within the barrel to retain adjacent sheets in engagement with one another and in engagement with the form until the adhesive sets.

10. A method of manufacturing a barrel which consists of precutting sheets of wood to form a plurality of joined staves, of disposing adhesive material between adjacent sheets, of arranging a plurality of sheets within a mold form having the interior surface in the configuration of a barrel, of disposing an expansible membrane within the barrel shaped form produced by the sheets when arranged within the mold form, and expanding the membrane into engagement with the innermost sheet to force the sheets into engagement with one another and into engagement with the inner surface of the mold form until the adhesive sets.

CLARENCE U. GRAMELSPACHER.